United States Patent
McCann

(10) Patent No.: US 11,453,136 B2
(45) Date of Patent: Sep. 27, 2022

(54) HAND KNIFE WITH INTEGRATED MITER GUIDE

(71) Applicant: Kevin Otis McCann, Tucson, AZ (US)

(72) Inventor: Kevin Otis McCann, Tucson, AZ (US)

(*) Notice: Subject to any disclaimer, the term of this patent is extended or adjusted under 35 U.S.C. 154(b) by 366 days.

(21) Appl. No.: 16/814,929

(22) Filed: Mar. 10, 2020

(65) Prior Publication Data
US 2020/0290222 A1    Sep. 17, 2020

Related U.S. Application Data

(60) Provisional application No. 62/818,724, filed on Mar. 14, 2019.

(51) Int. Cl.
  *B26B 11/00*  (2006.01)
  *G01B 3/02*  (2020.01)
  *G01B 3/56*  (2006.01)

(52) U.S. Cl.
  CPC .............. *B26B 11/006* (2013.01); *G01B 3/02* (2013.01); *G01B 3/56* (2013.01)

(58) Field of Classification Search
  CPC ............ B26B 11/006; G01B 3/02; G01B 3/56
  See application file for complete search history.

(56) References Cited

U.S. PATENT DOCUMENTS

| | | | |
|---|---|---|---|
| 1,228,431 A | 6/1917 | Hanson | |
| 1,272,691 A * | 7/1918 | Maher | B27B 21/08 7/150 |
| 1,281,810 A * | 10/1918 | Morrisey | B27B 21/08 7/150 |
| 1,306,165 A * | 6/1919 | Benson | B27B 21/08 7/150 |
| 1,385,855 A * | 7/1921 | Balod | B27B 21/08 7/150 |
| 1,590,554 A * | 6/1926 | Semelroth | B27B 21/08 7/150 |
| 1,754,035 A * | 4/1930 | Morren | B27B 21/08 7/150 |

(Continued)

FOREIGN PATENT DOCUMENTS

| | | | |
|---|---|---|---|
| FR | 2759936 A1 * | 8/1998 | ........... B26B 11/006 |
| GB | 625161 A * | 6/1949 | |
| SK | 6157 Y1 | 6/2012 | |

OTHER PUBLICATIONS

ArmaCell LLC ArmaFlex Application Manual, US 2018, p. 25.
11752 Apr. 27, 1818, LOEBS Design for Saw Blades, p. 1, Fig. 1.

*Primary Examiner* — Nimeshkumar D Patel
*Assistant Examiner* — Tania Courson

(57) ABSTRACT

A hand knife tool has alignment markings configured on its blade to help orientate the cutting edge of the knife tool across a workpiece to make a miter cut. A transverse axis is defined perpendicular to a substantially straight middle section of the cutting edge and bisecting the two faces of the knife blade. Each alignment marking is configured on the knife blade at an angle relative to the transverse axis. Each of the alignment markings visually delineate an alignment line substantially across the knife blade between the cutting edge and the blade back. When one of the alignment markings on the knife tool is aligned to the edge of a workpiece, it places the cutting edge of the knife tool across the workpiece at a substantially congruent angle. Then the knife can be pivoted upon its edge and then make a miter cut.

8 Claims, 4 Drawing Sheets

(56) References Cited

U.S. PATENT DOCUMENTS

| | | | | |
|---|---|---|---|---|
| 2,435,225 | A | * | 2/1948 | Kolodner ............. B23D 61/123 83/750 |
| 2,554,749 | A | * | 5/1951 | Peeples .................. B27B 21/08 7/150 |
| 2,560,127 | A | * | 7/1951 | Peeples .................. B27B 21/08 7/150 |
| 3,598,157 | A | * | 8/1971 | Farr ....................... F16L 59/22 285/47 |
| 5,107,560 | A | * | 4/1992 | Hulsey ..................... B25F 1/04 7/164 |
| 5,206,965 | A | | 5/1993 | Rowley |
| 6,513,247 | B1 | | 2/2003 | Krasik-Geiger |
| 7,073,240 | B2 | * | 7/2006 | Eberly .................... B43L 7/033 33/476 |
| 7,174,643 | B2 | | 2/2007 | Van Der Merwe |
| 8,281,494 | B2 | | 10/2012 | Archambault |

\* cited by examiner

HAND KNIFE WITH INTEGRATED MITER GUIDE

CROSS-REFERENCES TO RELATED APPLICATIONS

This is a nonprovisional application claiming benefit from provisional application No. 62/818,724 filed on Mar. 14, 2019.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of Invention

This invention relates to hand cutting tools. This invention particularly relates to hand knives combined with a guide for positioning the blade for miter cuts.

2. Description of the Related Art

Hand knives are one of the oldest inventions and are still a regularly used tool for installing thermal pipe insulation. Professional installers, refrigeration mechanics, plumbers, and even homeowners may install pipe insulation. Professional installers are rarely without their trusty knife nearby or on their side in a scabbard, which they use for slicing, trimming and cutting holes in the insulation. Knives with long substantially straight blades, and with plan or serrated edges, similar to boning style kitchen knives are often used for their varied utility in working with insulation material.

To make insulation fit neatly around a pipe fitting, miter joints are often needed. To make a high-quality miter cut on a tube of thermal pipe insulation without a guide is not easy. Miter boxes, measuring tools, templates, and even factory pre-made insulation fittings are used and sold in the trade. These methods can be cumbersome, inconvenient or expensive, so people often just do a quick cut and accept that the miter is not done as well as it could be, or they try the cut again in hopes it will be better. Poorly produced miter cuts can make insulation less effective, waste material, and make the work look sloppy. Pipe insulation is important for saving energy and for pipe protection. What is needed is a knife with a convenient miter guide integrated right on the blade so a user can quickly orientate the edge to make a miter cut without the need for any other tools. Particularly useful would be a guide that does not get in the way of the other utility aspects of the knife. A hand knife that can work well for pipe insulation and that has an integrated miter guide is a needed addition to the art.

SUMMARY OF THE INVENTION

A hand knife with a longitudinally elongated knife blade is substantially planar and has two blade faces. Alignment markings are configured on the knife blade relative to a transverse axis. The transverse axis is defined as perpendicular to a substantially straight middle section of the knife blade's cutting edge and bisecting the two blade faces. The alignment markings are configured at an angle that is between 45-degrees and 0-degrees, inclusive, with at least one of the alignment markings configured at 45-degrees on the first face. Each alignment marking visually delineates a line substantially across the knife blade between the cutting edge and the blade back, inclusive. The alignment marking can be aligned with the edge of a workpiece, which also orientates the cutting edge of the knife blade across the workpiece at a substantially congruent angle. The user is then ready to simply pivot the knife on its cutting edge and make a cut. A precision miter cut can be made with just this convenient hand knife without using additional tools or pre-marking the material.

Many possible aspects of a preferred embodiment have been contemplated. As an example, the alignment markings can be distributed on the knife blade to be primarily in the blade's proximal or the blade's distal sections, or, preferably, in both. A preferred embodiment may also have some of the alignment markings that may be on the same face sloped in opposite directions from another alignment marking. A preferred embodiment may include other common miter angles. For example, a 22.5-degree angle is a commonly used miter angle and so may be very useful in a preferred embodiment. A 0-degree angle, which would be parallel to the transverse axis, would be useful for a cut straight across a workpiece, and so, may also be included in a preferred embodiment.

Other aspects can be included in a preferred embodiment that adds to the operational value of the invention without departing from the scope and spirit of the invention. For example, indicia may be disposed on the blade to show corresponding angle values for the various alignment markings. Also, the handle that the blade attaches to should be considered. Additionally, distance measurement markings can be configured on the knife blade to add value to the invention's operation.

Various aspects and advantages of the present invention will become more apparent from the following detailed description of a preferred embodiment of the invention, along with the accompanying drawings in which like numerals represent like components.

DETAILED DESCRIPTION OF THE INVENTION

A hand knife with an integrated miter guide is described below in terms of a preferred embodiment of the invention. Reference will be made to the drawings to help with understanding, in which like numerals and letter designations represent like features. It will be apparent to those skilled in the art that variations or modifications can be made without departing from the scope and spirit of the invention.

Figure 1:
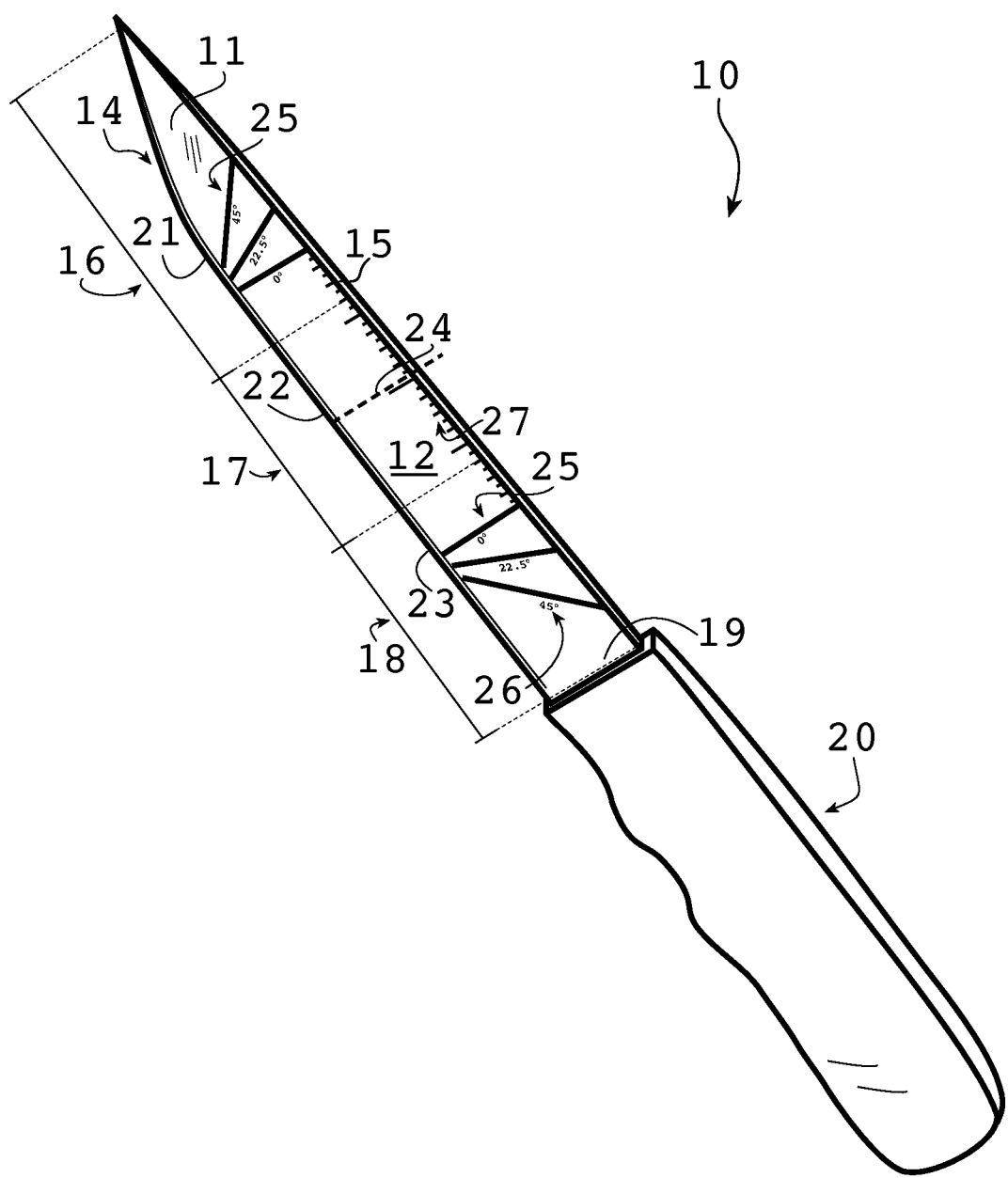
FIG. 1 is a perspective view showing predominantly a first side of a preferred embodiment of the invention.
Figure 2:
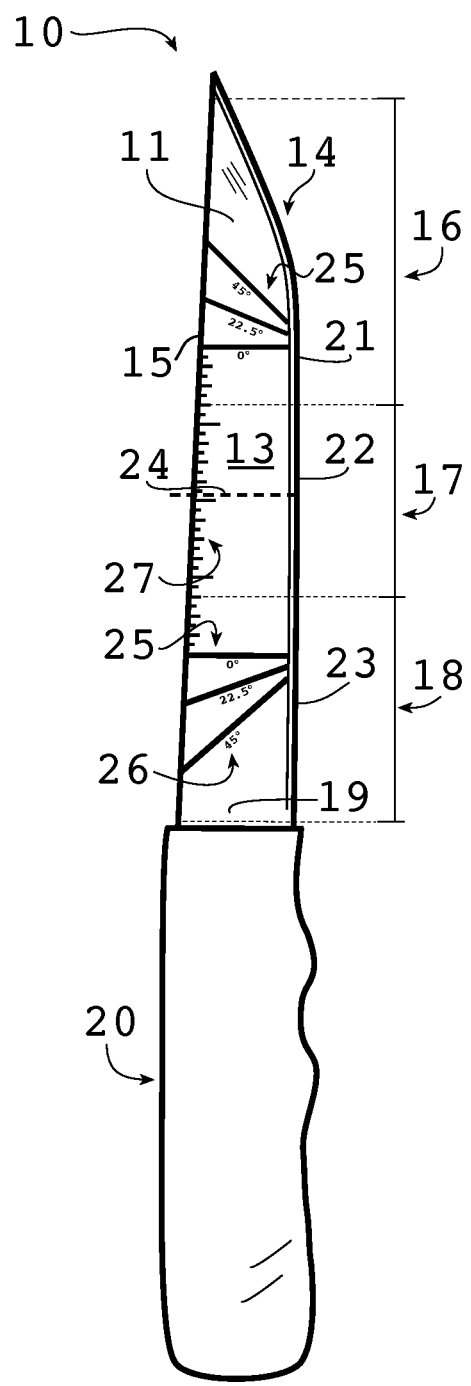
FIG. 2 is a side view showing a second side of a preferred embodiment of the invention.

FIGS. 1-2 shows the hand knife 10 has a longitudinally elongated knife blade 11 which has a substantially planar shape. The first face 12 of the knife is shown in a perspective view in FIG. 1. The second face 13 is shown in a side view in FIG. 2. The knife blade is shown with three sections pointed out in the drawings: the blade distal section 16, the blade middle section 17 adjacent to the blade distal section 16, and the blade proximal section 18 adjacent to the blade middle section 17. Additionally, there is a blade proximal end 19 extending from the blade proximal section 18, which is suitable to be attached to a handle. As shown, a handle 20 is attached to the blade proximal end 19. The longitudinal cutting edge 14 is at the contiguous edge of the first face 12 and second face 13. The blade back 15 is substantially opposite from the cutting edge 14.

The cutting edge has three sections which coincide with the three knife blade sections: a cutting edge distal section 21, a cutting edge middle section 22, and a cutting edge proximal section 23. The cutting edge middle section 22 is a substantially straight section of the cutting edge 14 and so is used as a reference line. In this preferred embodiment, the cutting edge 14 is depicted as a plain style edge. Many variations and styles for the invention have been contemplated. In another embodiment the cutting edge 14 may be a serrated type edge; in which case, a line can still be considered across the serrated peaks to define a substantially straight line so the cutting edge middle section can still be used as a reference line.

A transverse axis 24 is defined perpendicular to the cutting edge middle section and bisecting the first face and second face. The transverse axis 24 is shown as a dashed line at the blade middle section 17 area in FIGS. 1-2. The transverse axis 24 is used as a reference for manufacturing and design and is not an actual physical feature on the invention. A plurality of alignment markings 25 is shown configured on the first face 12 in FIG. 1 and on the second face 13 in FIG. 2. Each alignment marking from the plurality of alignment markings 25 is configured on the knife blade 11 at an angle between 45-degrees and 0-degrees, inclusive, relative to the transverse axis 24 as looking from a side view.

It should be noted here that the angle of a line can be described or labeled with a different value depending on the reference axis used even though its configuration may be the same on the knife blade, of course. Indicia 26 are disposed on the knife blade 11 to indicate the corresponding angle value of the plurality of alignment markings 25. The configured angles of the plurality of alignment markings 25 are described relative to the transverse axis 24, as opposed to the cutting edge middle section 22. The corresponding angle values are described between 45-degrees and 0-degrees, inclusive so the alignment markings angle value, represents the congruent angle that is formed across the workpiece by the cutting edge middle section 22. For example, it would be unclear to a user of the invention if the 22.5-degree alignment marking 25a, in FIGS. 3-4, was described as 67.5-degrees relative to the cutting edge middle section, even though it is the same configuration on the knife. This is why the transverse axis is used as the reference instead of just using the cutting edge middle section, particularly for angles less than 45-degrees. Many people think of a cut that is straight across a workpiece as a 90-degree cut, so in some embodiments, a 0-degree alignment marking can be labeled by indicia 26 or shown in instructions, to show it as 90-degree value. This would be a design choice and would not depart from the principal of the invention, as it is just a labeling decision. The alignment markings do not have to be labeled, but it is preferred that they are.

It should also be noted that the plurality of alignment markings is configured relative to a common axis configuration and not deliberately to a common vertex, as would be with a protractor type configuration. This allows the plurality of alignment markings 25 to be distributed in several beneficial locations on the knife. It gives a lot of choices for the layout and design of the knife, as will become clear to those skilled in the art.

Each of the plurality of alignment markings 25 visually delineates a line substantially across the knife blade 11 between the cutting edge 14 and the blade back 15, inclusive. In this preferred embodiment, each of the plurality of alignment markings is depicted as a solid line. However, the alignment marking can be delineated in other ways too, such as a series of dots, line segments or other artful depictions. As long as the plurality of alignment markings 25 are visually clear to give the user distinctive points of alignment on or near the cutting edge 14 and across to or near the blade back 15, then different artful choices for the alignment markings will not depart from the scope of the invention.

The angle alignment markings also need to be very durable to allow for heavy use and cleaning. The plurality of alignment markings 25 should be made on to the knife blade 11 by methods used for making lasting markings or by being part of the initial forming of the tool, such as, but not limited to, laser engraving, mechanical engraving, stamping, casting, or electro-chemical processes.

In FIGS. 1-4, the plurality of alignment markings 25 are shown distributed to the different sections of the knife blade 11 on the first face 12 and second face 13. It will be obvious to those skilled in the art and the benefit of this disclosure, that the exact size of each section is not critical to the scope of the invention. The cutting edge middle section needs to be long enough to have to be able to visualize a line predominantly across the workpiece. A typical insulation knife blade may be about 5 to 8 inches long. So about one-third to one-fourth of the blade length can be expected to take up the middle section, however, this may change with different blade shapes, so this is not meant to be a fixed limit. It is advantageous to have the alignment markings distributed primarily in the blade proximal section 18 and in the blade distal section 16. When a user is aligning a particular alignment marking with a longitudinal edge of a workpiece, such as thermal pipe insulation, the user will find the alignment markings located predominantly in the blade proximal section 18 easier to align to the workpiece edge closest to the user. The user will also find the alignment markings located predominantly in the blade distal section 16 easier to align to the workpiece edge that is further from the user. Additionally, this configuration places the blade middle section in a more centered position over the workpiece when aligning for a miter cut. This also leaves the blade middle section free to be used, if desired, as in this preferred embodiment, for additional features such as distance measurement markings 27.

At least one alignment marking from the plurality of alignment markings 25 is configured at 45-degrees relative to the transverse axis on the first face because a 45-degree angle is the most common miter angle. A 22.5-degree angle is probably the next most used miter angle. A 0-degree alignment marking is useful for making a cut straight across the workpiece. In this preferred embodiment, the plurality of alignment markings includes markings configured at 45-degree, 22.5-degree and 0-degree, each distributed predominantly in the blade distal section 16, predominantly in the blade proximal section 18, and on the first face 12 and second face 13.

Additionally, it should be noted, in this preferred embodiment, some of the alignment markings from the plurality of alignment markings that are on the same face are sloped in opposite directions of each other. Having the alignment markings sloped in opposite directions helps facilitate using the knife in either the left or right hand or at different grip angles.

The plurality of alignment markings 25 can, of course, include more or fewer alignment markings and different angles than the ones shown for this preferred embodiment. A 15-degree and an 11.25-degree are also common angles in the art, but not as common. This embodiment has been contemplated to find a balance of form and functionality. Also contemplated, if the hand knife comes in a fixed blade style or a folding style does not cause a departure from the invention. Those skilled in the art will appreciate that there are many possibilities within the scope of the invention.

Figure 3:
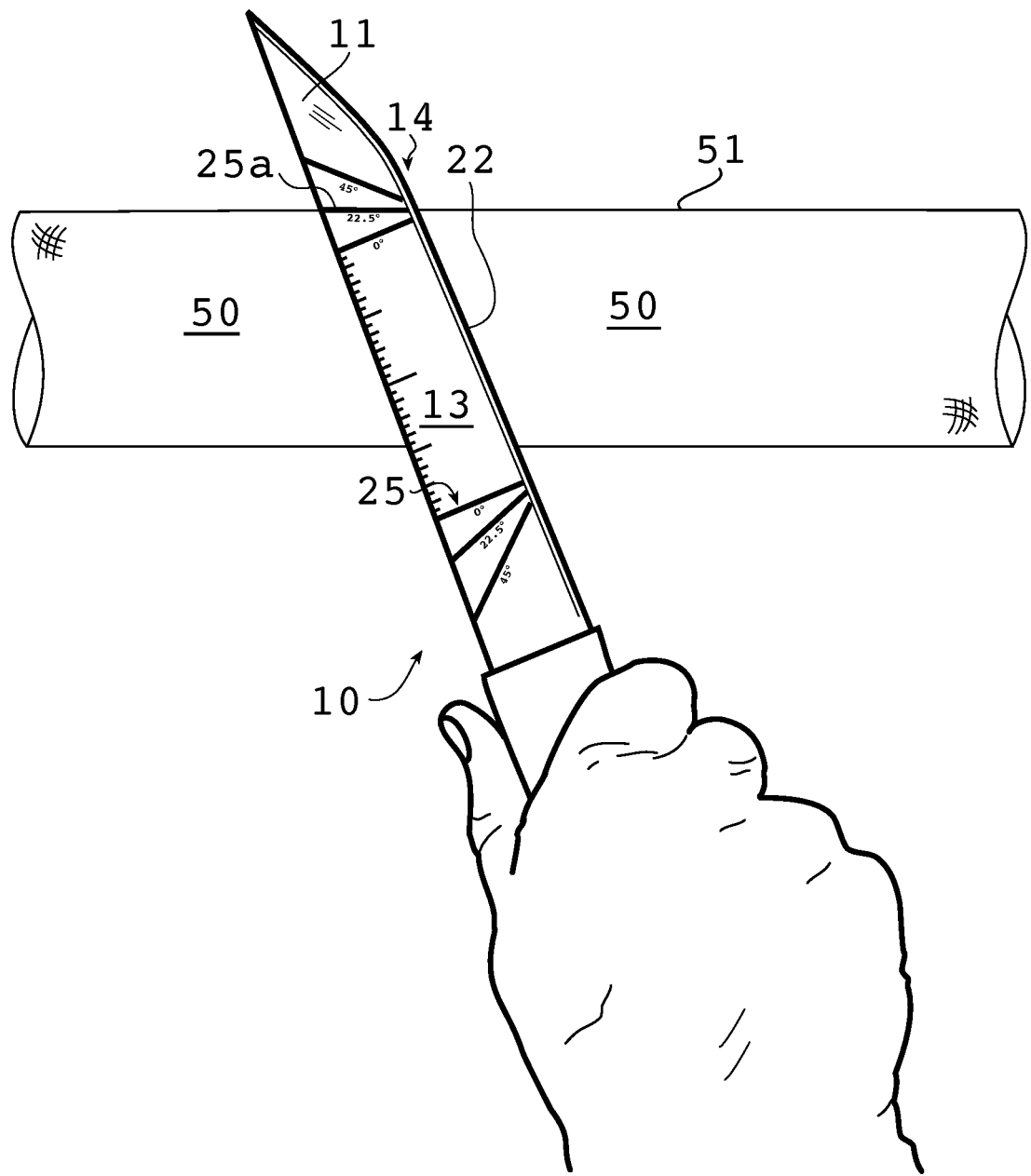
FIG. 3 is a view of the invention in use, looking at the side of the hand knife as the knife is placed flat across the surface of a workpiece with one alignment marking aligned with an edge of the workpiece.
Figure 4:
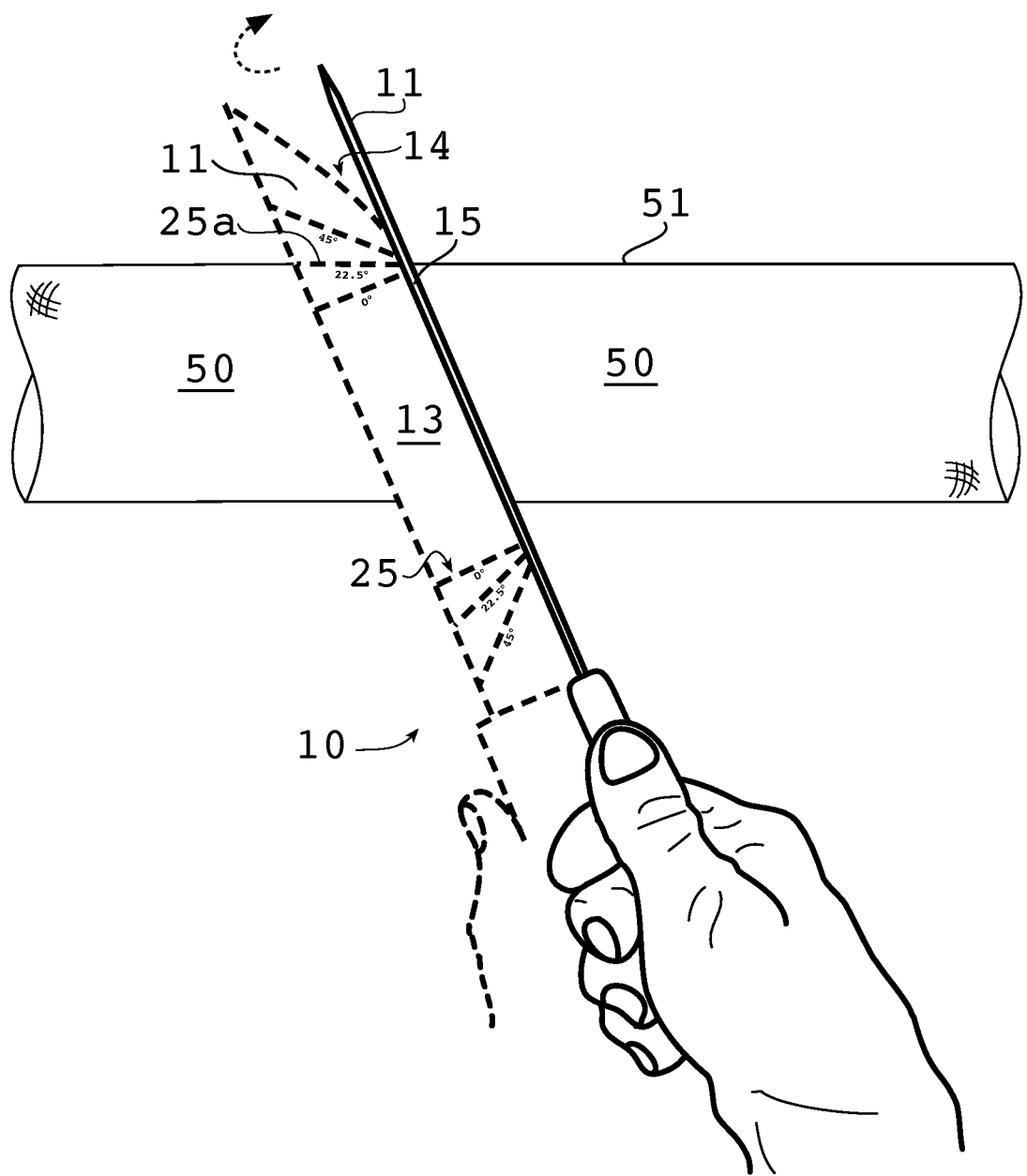
FIG. 4 is a view of the invention in use, showing the knife as it has been pivoted up from a flat position to a perpendicular position while on the surface of the workpiece.

FIGS. 3-4, is an illustration of the hand knife 10 while it is in use. FIG. 3 shows the hand knife 10 with the knife blade 11 laid flat across a workpiece 50 while looking straight down over the hand knife 10 with the workpiece 50 behind it. The plurality of alignment markings 25 that are on the second face 13 can be seen. One of the alignment markings 25*a* from the plurality of alignment markings 25 is visually aligned with a longitudinal edge of the workpiece 51. The cutting edge middle section 22 is seen across the workpiece at a congruent angle to that formed by the alignment marking 25*a* and the axial plane 24, which in this case is 22.5-degrees.

FIG. 4 shows the hand knife 10 as it is pivoted upon its cutting edge 14 after aligning the alignment marking 25*a* with the longitudinal edge of the workpiece 51. The blade back 15 can be seen as the blade face 13 becomes perpendicular to the workpiece 50.

The hand knife 10 is then in a position to make a precision miter cut. The user simply slices through the workpiece 50 while holding the knife at the determined angle.

I claim:

1. A hand knife with an integrated miter guide, suitable for cutting a workpiece such as a thermal pipe insulation, comprising:
    a longitudinally elongated knife blade, the knife blade being substantially planar and comprising a first face, a second face opposite from the first face, a longitudinal cutting edge at a contiguous edge of the first face and the second face, and a blade back substantially opposite of the cutting edge, a blade distal section, a blade middle section adjacent to the blade distal section, a blade proximal section adjacent to the blade middle section, and a blade proximal end extending from the blade proximal section being suitable to be attached to a handle,
    wherein the longitudinal cutting edge comprises a cutting edge distal section, a cutting edge middle section adjacent to the cutting edge distal section, and a cutting edge proximal section adjacent to the cutting edge middle section, wherein the cutting edge middle section defines a substantially straight line, and wherein
    a transverse axis is defined perpendicular to the cutting edge middle section and bisecting the first face and second face; and
    a plurality of alignment markings disposed on the knife blade configured at an angle between 45-degrees and 0-degrees, inclusive, relative to the transverse axis, wherein each from the plurality of alignment markings visually delineates a line substantially across the knife blade between the cutting edge and the blade back, inclusive, wherein at least one from the plurality of alignment markings is configured at 45-degrees on the first face; and
    further comprising indicia disposed on the knife blade indicating angle values corresponding to the plurality of alignment markings;
    wherein the cutting edge middle section lays across the workpiece at a congruent angle to that formed by the alignment markings and the transverse axis.

2. The hand knife defined in claim 1, wherein at least one from the plurality of alignment markings is located predominantly in the knife blade proximal section.

3. The hand knife defined in claim 1, wherein at least one from the plurality of alignment markings is located predominantly in the knife blade distal section.

4. The hand knife defined in claim 1, wherein at least one of the plurality of alignment markings is sloped in the opposite direction from another at least one from the plurality of alignment markings.

5. The hand knife defined in claim 1, wherein at least one from the plurality of alignment markings is configured at 22.5-degrees.

6. The hand knife defined in claim 1, wherein at least one from the plurality of alignment markings is configured at 0-degrees.

7. The hand knife defined in claim 1, further comprising a plurality of distance measurement index markings configured on the knife blade.

8. The hand knife in claim 1, further comprising the handle connected to the blade proximal end.

* * * * *